United States Patent
Puster

[15] 3,681,832
[45] Aug. 8, 1972

[54] METHOD OF MAKING A POPPET VALVE CONSTRUCTION

[72] Inventor: Louis M. Puster, Knoxille, Tenn.
[73] Assignee: Robertshaw Controls Company, Richmond, Va.
[22] Filed: Feb. 19, 1970
[21] Appl. No.: 14,874

Related U.S. Application Data

[62] Division of Ser. No. 829,498, June 2, 1969, Pat. No. 3,558,098.

[52] U.S. Cl. .........................29/157.1 R, 29/156.7 R
[51] Int. Cl. .....B21d 53/00, B21k 29/00, B23p 15/26
[58] Field of Search....29/156.7 R, 157.1 R, 156.7 C, 29/156.7 B, 156.7 A; 251/84-88, 357

[56] References Cited

UNITED STATES PATENTS

| | | | |
|---|---|---|---|
| 2,418,447 | 4/1947 | Arbogast | 29/157.1 R |
| 2,444,595 | 7/1948 | Doerr et al. | 251/357 |
| 2,479,688 | 8/1949 | Lindgren | 251/86 |
| 2,613,907 | 10/1952 | Stillwagon, Jr. | 251/85 |
| 2,848,803 | 8/1958 | Schock | 29/517 |

Primary Examiner—John F. Campbell
Assistant Examiner—Victor A. DiPalma
Attorney—Auzville Jackson, Jr., Robert L. Marden and Candor and Candor

[57] ABSTRACT

A method of making a valve construction comprising the steps of telescopically disposing a free end of a valve stem in a cup-shaped member at the closed end thereof so that the remainder of the stem projects out through an opening in the closed end, disposing a spring on the free end of the stem, forming a recess in a valve poppet, disposing the valve poppet in the end of the cup-shaped member so that the spring urges the free end of the valve stem against the valve poppet while permitting a swivel action therebetween, and staking the side wall of the cup-shaped member between the closed and open ends thereof into the recess of the valve poppet to secure the valve construction together.

8 Claims, 2 Drawing Figures

PATENTED AUG 8 1972　　　　　　　　　　　　　　　　　3,681,832

METHOD OF MAKING A POPPET VALVE CONSTRUCTION

This application is a divisional patent application of its co-pending parent application, Ser. No. 829,498, filed June 2, 1969, now U.S. Pat. No. 3,558,098, and is assigned to the same assignee to whom the parent application is assigned.

This invention relates to a valve construction means as well as to the method for making such a valve construction means or the like.

It is well known to provide a valve poppet for opening and closing a valve seat, the valve poppet being interconnected to a valve stem by a spring arrangement therebetween so that the valve poppet will tend to move in unison with the valve stem while permitting relative movement therebetween so that the valve poppet will positively seat on the valve seat even if the valve seat is out of alignment relative to the valve stem.

Accordingly, one feature of this invention is to provide an improved valve construction of the above type wherein the parts are simple and economical to manufacture as well as being simple and economical to assemble together.

In particular, one embodiment of this invention provides a valve stem having a free end telescopically received through an opening means in the closed end of a cup-shaped member containing a valve poppet having a valve member at the open end of the cup-shaped member for seating against a valve seat, a spring means being disposed between the closed end of the cup-shaped member and a retainer on the free end of the valve stem to tend to urge the free end of the valve stem into engagement with the valve poppet while permitting swivel action therebetween. The side wall means of the cup-shaped member between the open and closed ends thereof are staked into recess means of the valve poppet to secure the valve construction parts together.

Accordingly, it is an object of this invention to provide a valve construction means having one or more of the novel features set forth above or hereinafter shown or described.

Another object of this invention is to provide an improved method for making such a valve construction means or the like, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figures 1, 2:
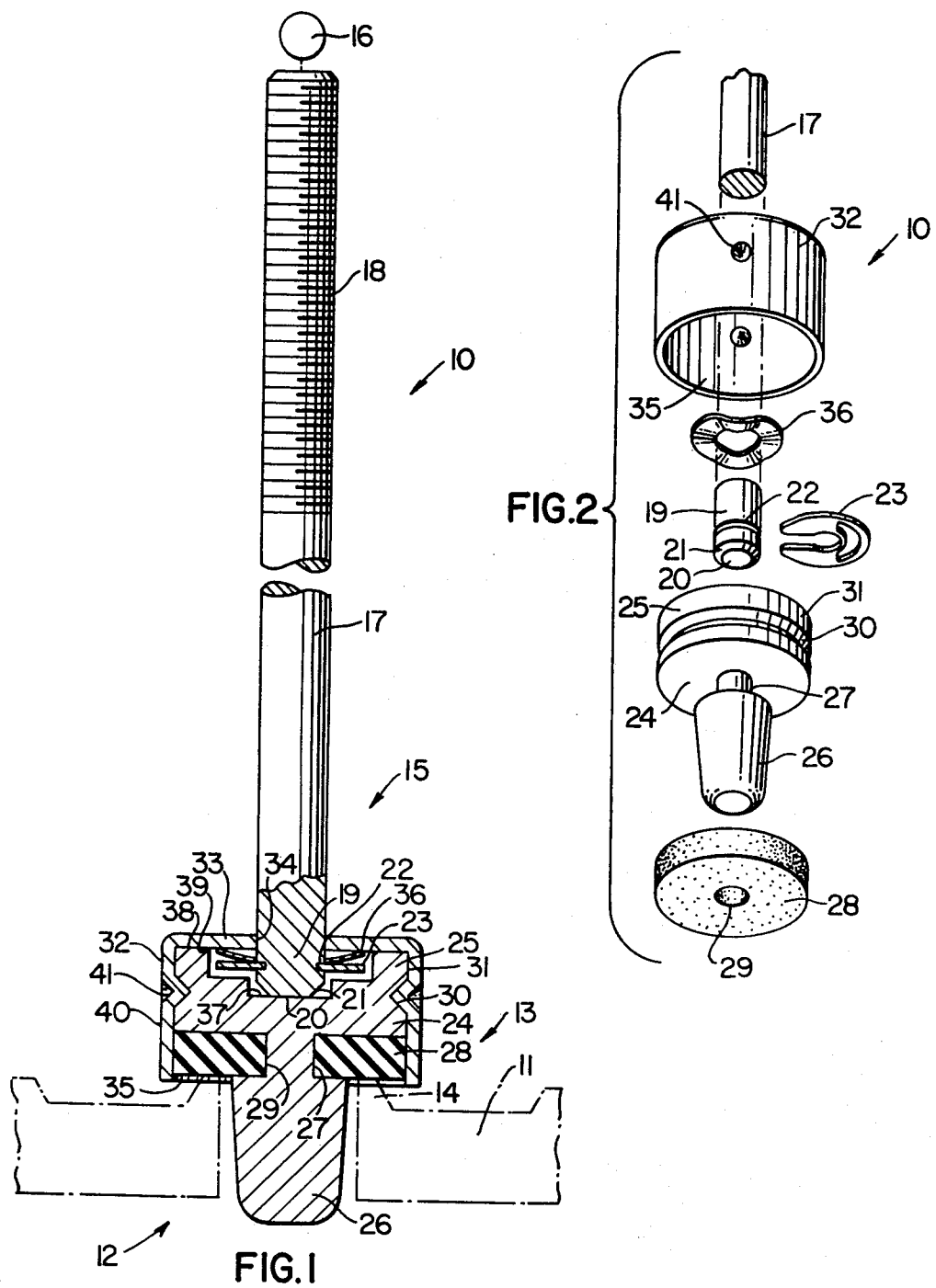
FIG. 1 is a cross-sectional view illustrating the improved valve construction means of this invention, the valve seat and the housing means being illustrated in dash dotted lines.
FIG. 2 is a reduced, fragmentary, exploded, perspective view of the various parts of the valve construction means of FIG. 1.

While the various features of this invention are hereinafter described and illustrated as being particularly adapted for providing a valve poppet means for controlling a valve seat means, it must be understood that the various features of this invention can be utilized singly or in any combination thereof to provide valve means for other devices as desired.

Therefore, this invention is not to be limited to only the embodiment illustrated in the drawings, because the drawings are merely utilized to illustrate one of the wide variety of uses of this invention.

Referring now to FIGS. 1 and 2, the improved valve construction means of this invention is generally indicated by the reference numeral 10 and comprises a housing means 11 having an inlet chamber 12 and an outlet chamber 13 adapted to be fluidly interconnected together by a valve seat 14 that is opened and closed by a valve construction 15 of this invention, the valve construction 15 being adapted to be moved relative to the valve seat 14 by a conventional actuator 16.

The valve construction 15 includes a valve stem 17 having its upper end 18 externally threaded for coupling to the actuator 16 in a conventional manner, the lower free end 19 of the valve stem 17 terminating at a flat circular end surface 20 that is surrounded by a frusto-conical surface 21 having its smaller end adjacent the flat end surface 20. An annular groove 22 is formed in the free end 19 of the valve stem 17 inboard of the frusto-conical surface 21 and receives a retaining ring 23 in the manner illustrated in FIGS. 1 and 2 so that the retaining ring 23 extends substantially circumferentially outwardly from the free end 19 of the valve stem 17 in substantially parallel relation to the flat end surface 20 thereof.

A one-piece molded plastic valve poppet 24 is provided and has an upper substantially cylindrical portion 25 integrally interconnected to a substantially frusto-conical valve portion 26 that is separated from the cylindrical portion 25 by an annular groove 27 that is adapted to snap-fittingly receive a resilient washer-like valve member 28 that can be forced over the frusto-conical valve portion 26 at a central aperture 29 of the valve member 28 so that the same can be snap-fitted into the annular groove 27 and be carried by the valve poppet 24.

An annular groove 30 is provided in the side wall means 31 of the cylindrical portion 25 of the valve poppet 24 with such annular groove 30 being substantially V-shaped in transverse cross section.

A cup-shaped member 32 is provided for the valve construction 15 and has a closed end 33 provided with an opening means 34 centrally therethrough to loosely receive the free end 19 of the valve stem 17 in the manner illustrated in FIG. 1, the cup-shaped member 32 being so constructed and arranged that the same is adapted to receive the cylindrical portion 25 of the valve poppet 24 and its valve member 28 through the open end 35 thereof in a snug fit relation so that the valve member 28 faces outwardly at the open end 35 of the cup-shaped member 32.

A spring means 36, such as a wavy washer-like member, is adapted to be disposed between the closed end 33 of the cup-shaped member 32 and the retainer 23 on the free end 19 of the valve stem 17 in the manner illustrated in FIG. 1 so as to always tend to urge the flat end surface 20 of the valve stem 17 into engagement with a flat end surface 37 of the valve poppet 24 in the manner illustrated in FIG. 1 so that the valve poppet 24 tends to move in unison with the valve stem 17 while permitting swivel action of the valve poppet 24 relative to the valve stem 17 in a manner hereinafter described.

From the above description, it can be seen that the various parts of the valve construction 15 of this invention can be formed in a simple and economical manner and can be assembled in a relatively simple manner now to be described.

The free end 19 of the valve stem 17 is adapted to be telescopically disposed within the cup-shaped member 32 by either inserting the upper end 18 of the stem 17 through the open end 35 of the cup-shaped member 32 and through the opening means 34 thereof after the retainer 23 has been fastened to the free end 19 and the wavy spring 36 has been telescoped onto the stem 17 so as to rest against the retainer 23 or by having the free end 19 of the valve stem 17 inserted through the opening means 34 of the cup-shaped member 32 with the wavy spring 36 and retainer 23 being assembled thereto after such telescoping relation.

In any event, after the free end 19 of the valve stem 17 is disposed in its telescoped position with the retainer 23 and leaf spring 36 between the retainer 23 and the closed end 33 of the cup-shaped member 32, the preassembled valve member 28 and valve poppet 24 are then inserted through the open end 35 of the cup-shaped member 32 until an upper end surface 38 of the valve poppet 24 bottoms out against the interior surface 39 of the closed end 33 of the cup-shaped member 32, such bottoming out of the valve poppet 24 against the closed end 33 of the cup-shaped member 32 compressing the wavy spring 36 so that the same is under a desired degree of compression to tend to maintain the flat end means 20 of the valve stem 17 against the flat surface 37 of the valve poppet 24.

With the valve poppet 24 in the above described assembled relationship with the cup-shaped member 32, the side wall means 40 of the cup-shaped member 32 between the closed and open ends 33 and 35 thereof is inwardly staked at a plurality of circumferentially spaced places in an inward manner to define substantially V-shaped dimples 41 that are respectively received in the annular groove or recess means 30 of the valve poppet 24 to hold the various parts of the valve construction 15 in the assembled relationship illustrated in FIG. 1.

Thus, it can be seen that the valve construction 15 of this invention can be assembled in a simple and effective manner to operate in a manner now to be described.

With the assembled valve construction 15 disposed in the housing means 11 and interconnected to the actuator 16, it can be seen that the guide portion 26 of the valve poppet 24 is received through the valve seat 14 to guide movement of the valve construction 15 relative to the valve seat 14. In addition, it can be seen that the cup-shaped member 32 of the valve construction 15 is disposed in the outlet chamber 13 of the housing 11 so that the action of the resulting pressure drop across the valve member 28 is in a direction to tend to maintain the valve poppet 24 in direct engagement with the flat end surface 20 of the valve stem 17 for a purpose hereinafter described.

With the valve construction 15 disposed in its closed position against the valve seat 14 as illustrated in FIG. 1, it can be seen that the resilient valve member 28 is seated against the valve seat 14 and prevents fluid communication between the inlet chamber 12 and the outlet chamber 13 whereby the force of the pressure fluid in the inlet chamber 12 that is acting against the valve member 28 in a direction to open the valve member 28 is directly opposed by the valve stem 17 having its flat surface 20 abutting against the flat surface 37 of the valve poppet 24 so that such force of the inlet pressure fluid is not imposed on the wavy spring 36. In addition, when the actuator 16 pulls upwardly on the valve stem 17 to move the valve construction 15 away from the valve seat 15 to fluidly interconnect the inner chamber 12 to the outlet chamber 13, the valve poppet 24 has its flat end surface 37 maintained in positive contact with the flat end surface 20 of the valve stem 17 not only by the force of the compression spring 36, but also by the pressure drop acting across the valve member 28 so that there is no tendency for the compression spring 36 to "break down."

When the adaptor 16 is actuated to again close the valve construction 15 against the valve seat 14 from the open condition thereof, it can be seen that direct downward movement of the valve stem 17 by the actuator 16 directly moves the valve poppet 24 in unison therewith as the spring 36 maintains the end 20 of the valve stem 17 into positive engagement with the flat surface 37 of the valve poppet 24 and the action of the pressure fluid in the inlet chamber 12 is also assisting in such direct engagement of the valve poppet 24 against the valve stem 12. However, should the valve seat 14 be slightly out of alignment with the valve member 28 during the closing of valve member 28 thereagainst, the valve poppet 24 and its interconnected cup-shaped member 32 can swivel relative to the free end 19 of the valve stem 17 so that the valve member 28 will align itself to be moved flat against the valve seat 14 to fully close the same whereby the force necessary to seal the valve member 28 of this invention against the valve seat 14 can be considerably less than when a conventional rigid stem and poppet assembly is utilized as in the latter case, the actuator must force the flexible valve member into full seating engagement with the valve seat to compensate for such misalignment.

Accordingly, it can be seen that the valve construction 15 of this invention can swivel to provide accurate alignment between the valve member 28 and the valve seat 14 so that the force required to seat the valve construction 15 can be reduced. Further, the valve construction 15 of this invention is less prone to vibrate or chatter, as the thrust forces of the valve stem and the pressure drop forces of controlled fluid during the opening and closing of the valve construction 15 is directly absorbed by the valve poppet 24 and not by the spring washer 36, which would tend to "break down" the same and thereby leave the poppet 24 in a "-floating" situation to be susceptible to chatter or vibrations.

Thus, not only does this invention provide an improved valve construction means, but also this invention provides an improved method of making such a valve construction means or the like.

What is claimed is:

1. A method of making a valve construction comprising the steps of providing a cup-shaped member having a closed end and an open end with side wall means therebetween, telescopically disposing a free end of a valve stem in said cup-shaped member so that the remainder of said stem projects out through an opening in said closed end thereof, forming recess means in a valve poppet having a valve member for seating against a valve seat, disposing a spring means on said free end of said stem so that said spring means is adapted to be disposed between said closed end of said cup-shaped member and said free end of said stem, disposing said valve poppet in said open end of said cup-shaped member so that said spring means between said closed end of said cup-shaped member and said valve stem urges said free end of said valve stem against said valve poppet while permitting a swivel action therebetween, and staking said side wall means of said cup-shaped member between said closed and open ends thereof into said recess means of said valve poppet to secure said valve construction together.

2. A method as set forth in claim 1 wherein said step of forming said recess means in said valve poppet comprises the step of forming an annular groove in said valve poppet.

3. A method as set forth in claim 2 wherein said staking step comprises the step of staking a plurality of spaced dimples into said side wall means of said cup-shaped member so that said dimples are forced into said annular groove.

4. A method as set forth in claim 1 and further comprising the steps of forming an annular groove in said valve poppet, and snap-fitting a resilient washer-like member in said annular groove to provide said valve member at the open end of said cup-shaped member.

5. A method as set forth in claim 1 wherein said step of telescopically disposing said free end of said valve stem in said cup-shaped member comprises the step of inserting said free end of said valve stem through said opening in said cup-shaped member.

6. A method as set forth in claim 5 wherein said step of disposing said spring means on said free end of said stem is performed after said free end of said valve stem has been projected through said opening in said cup-shaped member.

7. A method as set forth in claim 1 wherein said step of telescopically disposing said free end of said valve stem in said cup-shaped member comprises the step of inserting said remainder of said stem into said open end of said cup-shaped member and then through said opening in said closed end thereof until said free end is disposed in said cup-shaped member in a desired position therein.

8. A method as set forth in claim 7 wherein said step of disposing said spring means on said free end of said stem occurs before said step of telescopically disposing said free end of said valve stem in said cup-shaped member.

* * * * *